(No Model.)

J. B. CAMPBELL.
CORN PLANTER.

No. 431,555. Patented July 8, 1890.

Witnesses:

Inventor:
John B. Campbell
by his Attorney

UNITED STATES PATENT OFFICE.

JOHN B. CAMPBELL, OF MAJENICA, INDIANA.

CORN-PLANTER.

SPECIFICATION forming part of Letters Patent No. 431,555, dated July 8, 1890.

Application filed March 28, 1890. Serial No. 345,681. (No model.)

*To all whom it may concern:*

Be it known that I, JOHN B. CAMPBELL, a citizen of the United States, residing at Majenica, in the county of Huntington and State of Indiana, have invented certain new and useful Improvements in Corn-Planters; and I do hereby declare the following to be a full, clear, and exact description of the invention, such as will enable others skilled in the art to which it appertains to make and use the same.

This invention is in the nature of certain improvements in that class of corn-planters designed to automatically drop the seed as the machine is drawn over the field transversely with the line of furrows; and it particularly relates to planters having a drag or vibrating arm, one end of which is pivotally connected with the frame of the planter and the other end resting on the ground and connected with the seed-slides in such manner as to cause them to reciprocate and drop the seed in hills, all as hereinafter more fully described.

The invention consists in the special construction and arrangement of parts hereinafter described and claimed, and shown by the accompanying drawings, in which—

Figure 1:
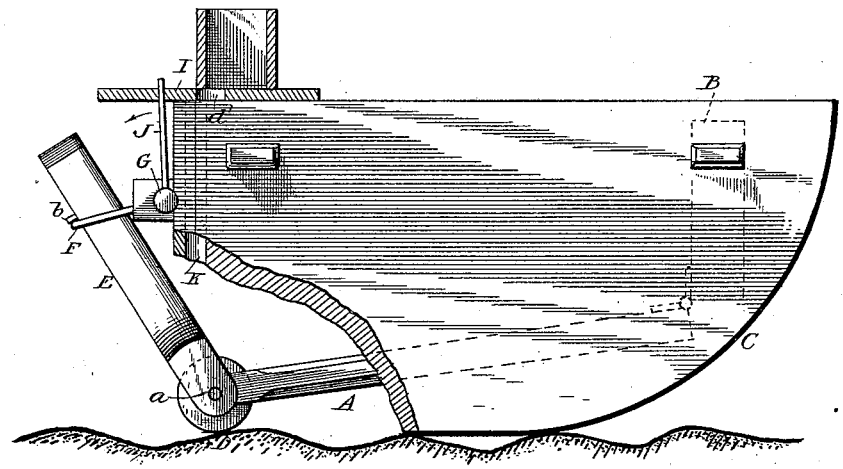
Figure 2:
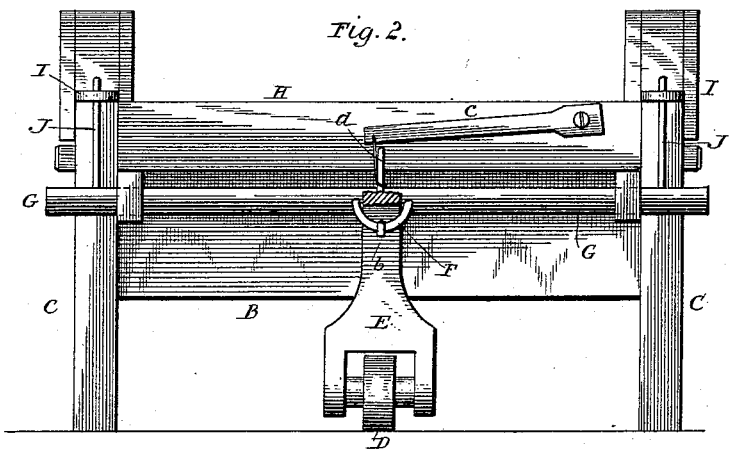

Figure 1 is a side elevation, partly broken away, and Fig. 2 a rear elevation.

Referring to the drawings, A denotes the drag, having its forward end pivoted to a bar B, connecting the runners C. The rear or free end of this drag is provided with a wheel D, carried by an axle $a$. From this free end of the drag vertically or upwardly projects an arm E, the upper end of which passes through a loop F and is retained therein by a pin $b$, driven into the said arm E in juxtaposition and just above said loop F. This loop is a rearward projection of the rock-shaft G, having its ends suitably supported in bearings on the runners C and held against the downward pull of the arm E by a spring $c$, connecting the cross-bar H and a pin $d$ of the rock-shaft G.

The seed-slides I are connected with the rock-shaft by rigid arms J, passing through enlarged holes in the projecting ends of said slides, and which in their movement rearward stop with the cup $d'$ in registration with the seed-spout K, which latter conveys the corn from the hopper L, all as is obvious from the construction and readily understood.

In operation, the planter being drawn over the field transversely with the furrows, the free end of the drag A, resting on the ground, follows its undulations and is caused to vibrate in the direction of the arrow, and on its downward movement by the arm E, loop F, and pin $b$ partially revolve the rock-shaft G, which latter is returned to its normal position by the spring $c$. It will therefore be understood that the seed-slides I, through the arm J, will partake of the movement of the rock-shaft and be reciprocated into the hopper to gather seed in the cup, and out until the cup registers with the spout K, through which the seed drop to the ground. Should the wheel D strike a large rock or other obstruction, the arm E, by reason of the position of the pin $b$, will freely pass up through the loop F, and thus not effect a movement of any other part of the machine, and consequently obviate tendency to break or push the loop higher than its normal or horizontal position.

While I have shown and described the working parts of this planter mounted upon runners, it is obviously understood that they may be mounted upon wheels without departing from the invention or requiring more than ordinary mechanical skill.

Having thus fully described my invention, what I claim as new, and desire to secure by Letters Patent, is—

1. In a corn-planter, a drag having its free end resting on the ground, and an arm extending from said free end, in combination with seed-dropping mechanism, substantially as described, whereby the downward movement only of the drag operates the seed-dropping mechanism.

2. In a corn-planter, the combination of the hinged drag A, having the roller D, and arm E, extending from the free end of the drag and having the pin $b$ thereon, and rock-shaft G, having the loop F, all substantially as shown and described.

3. In a corn-planter, the combination of the hinged drag A, having the roller D, and arm E, rock-shaft G, having the loop F, and arm J thereon, and the spring c, connected with the frame of the planter and with the arm J, all substantially as and for the purposes set forth.

In testimony whereof I affix my signature in presence of two witnesses.

JOHN B. CAMPBELL.

Witnesses:
THOMAS L. LUCAS,
JOHN J. HOLLEY.